United States Patent [19]

Suwa

[11] 4,183,639
[45] Jan. 15, 1980

[54] FOCUSING SYSTEM

[75] Inventor: Michiharu Suwa, Fuchu, Japan

[73] Assignee: Bell & Howell Company, Chicago, Ill.

[21] Appl. No.: 853,016

[22] Filed: Nov. 17, 1977

[30] Foreign Application Priority Data

| Nov. 25, 1976 [JP] | Japan | 51/141591 |
| Nov. 25, 1976 [JP] | Japan | 51/141592 |
| Nov. 25, 1976 [JP] | Japan | 51/141593 |
| Nov. 25, 1976 [JP] | Japan | 51/141594 |

[51] Int. Cl.$^2$ .............................................. G03B 7/08
[52] U.S. Cl. ............................. 354/25; 354/195; 352/140
[58] Field of Search .................. 354/25, 195; 352/140

[56] References Cited

U.S. PATENT DOCUMENTS

| 3,972,056 | 7/1976 | Tsujimoto et al. | 352/140 |
| 4,083,057 | 4/1978 | Quinn | 352/140 |
| 4,090,209 | 5/1978 | Kondo | 352/140 |

Primary Examiner—Russell E. Adams
Attorney, Agent, or Firm—Aaron Passman; Kirk McInerney

[57] ABSTRACT

A movie camera is shown with a zoom lens capable of automatic focus by movement of the lens system closest to the camera body instead of the front objective. As a result the system is more efficient because the heavy large front objective is fixed during automatic focusing and the focusing system need only move a smaller lens or group of lenses which are closer to the camera body. The variator, the compensator, the fourth lens group or any combination of them can be adjusted for automatic focusing.

21 Claims, 10 Drawing Figures

FOCUSING SYSTEM

BACKGROUND OF THE INVENTION

This invention relates to automatic focusing devices for movie camera zoom lenses and more particularly to an efficient low power system for focusing same. In the past zoom lenses have been focused by movement of a heavy large diameter front objective. The weight of such objectives and their distance from the body of the camera has required that large and powerful motors be adapted to adjust them for automatic focus. Such focusing systems require heavy auxiliary batteries or quickly use regular batteries. It is an object of this invention to provide an automatic focus for a zoom lens system of a movie camera which does not require extra high capacity or large and heavy batteries to power the motor for the automatic focusing of the lens.

SUMMARY OF THE INVENTION

An automatic focusing movie camera is disclosed which includes a system for moving the elements of the lens system of a zoom lens which are near the camera body. More particularly there is disclosed concepts for the control and movement of any one of the following groups; variator lens group, compensator lens group, rear lens group or combination thereof for the purpose of focusing without use of excess battery power as is required to move the heavier and larger front objective when focusing. When focusing with any lens that is close to the camera the front lens is fixed while the focusing is performed thereby permitting a simplified low power motor arrangement and connection to the focusing lens.

The focusing may be controlled by an automatic rangefinder of the type generally described in U.S. Pat. No. 4,002,899 assigned to Honeywell, Inc. Such automatic rangefinders are called the Honeywell Visitronics module and include two optical paths that bring light from the subject to photo sensitive detectors responsive to the fact that both optical paths are aligned with one another and are directed toward the same subject. Such alignment causes the detector to generate a peak pulse (greater than any other) which pulse can be used to adjust the focus of the camera lens. One of the optical paths is fixed relative to the rangefinder and camera lens and the other is moveable so as to scan along the other optical path. Rangefinding is accomplished by triangulation and comparison of the image from the fixed path with the image from the scanning path. By means of suitable electronic circuitry the peak signal can be converted to a control signal for the focusing motor.

Alternatively a system for detecting the focus through the taking lens can be used. Such a system includes a peek-in mirror which gathers a small portion of the incoming light aft of the focusing lens and transmits that light to a dithering photo detector. The detector is moved along the optical axis of the light gathered by the peek-in mirror so as to generate a varying signal depending upon the amount of light falling upon the detector. When the detector is dithered to the point where the light rays are in focus a peak signal is generated. Such a signal may be modified by electronic circuitry in order to control the focusing motor.

Anyone of the preceeding systems for detecting the position of the subject is responsive to the readjusted position of the focusing lens. That is to any that as the lens is focused the amount of detected adjustment for focus decreases. The rangefinder system and the through the taking lens system performed in a similar fashion.

Also disclosed is a mechanical linkage whereby the automatic focusing motor may be disengaged for manual focusing. The linkage provided simultaneously engages the automatic focus drive motor with the focusing lens and locks the front focus objective to prevent its movement. For manual focus the linkage disengages the motor and releases the front lens. The linkage makes the manual and automatic focusing systems mutually exclusive.

It is an object of the present invention to provide a highly efficient focusing system for a zoom lens which requires very little power for operation.

BRIEF DESCRIPTION OF THE DRAWINGS

FIG. 4 is a schematic representation of a focusing system using the second and third lens groups and includes a peek-in mirror to gather light from the taking lens aft of the focusing groups for the viewfinder.

FIG. 5 is a schematic representation of a focusing system using the second, third and fourth lens groups and includes a peek-in mirror to gather light from the taking lens aft of the focusing groups for the viewfinder.

FIG. 6 is an enlarged partial perspective view of the lock-out latch for the front focusing objective.

DETAILED DESCRIPTION OF THE DRAWINGS

Figure 1:
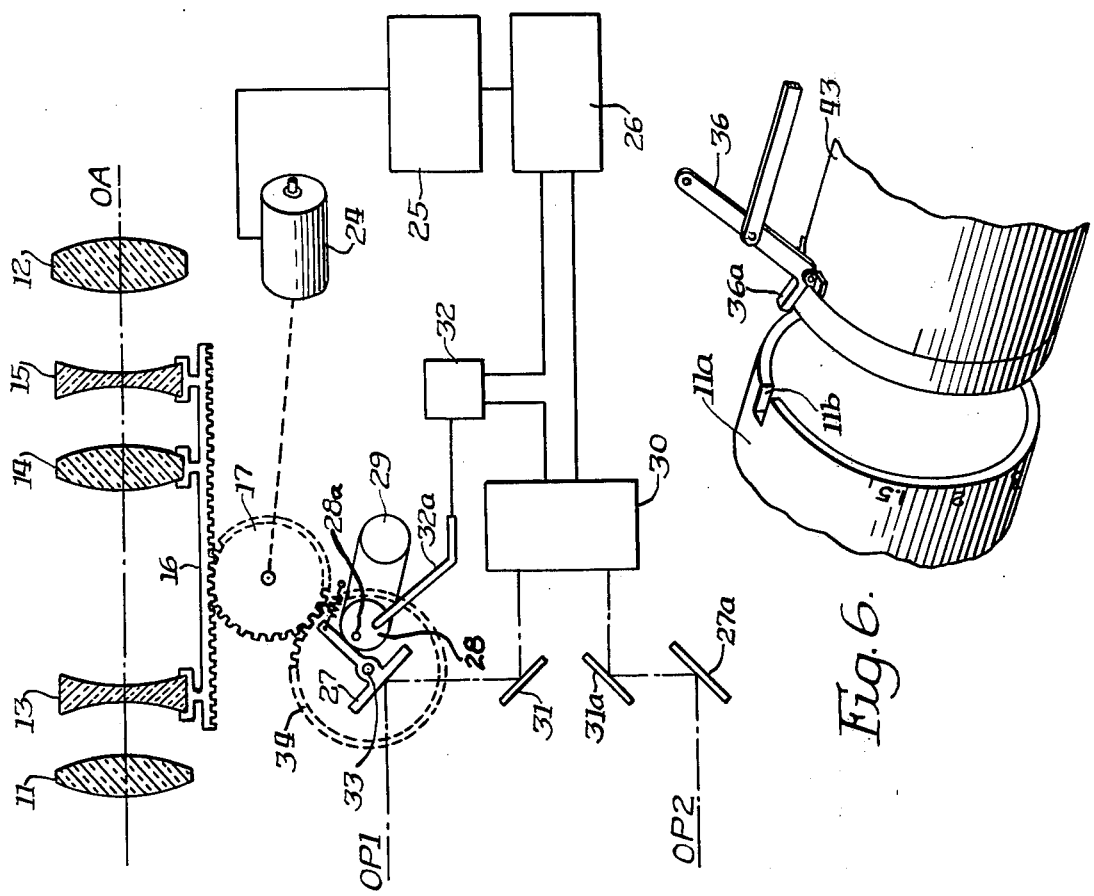
FIG. 1 is a schematic representation of the automatic focusing rangefinder system which controls the second, third, and fourth lens groups for focusing.

FIG. 1 shows schematically a system for moving the lighter, smaller lenses closer to the camera body for the purpose of focusing. In all the figures, each system is laid out with the front focusing lens 11 at the left and the prime lens 12 at the right disposed there between are moveable lenses 13, 14 and 15. To the extent that the systems are identical components will be identified with the same reference numbers. In FIG. 1 lens 13 is a variator lens and will be designated the second lens group; it may be composed of a single lens or a series of lens elements cemented or held together. Similarly, lens 14 is a compensator lens and it will be generally designated as the third lens group as it may be composed of a single lens or a series of lens elements cemented or held together. Lens 15 is a collimation lens and is referred to as the fourth lens group as it too may be composed of a single lens or a number of lens elements cemented or held together.

Figure 2:
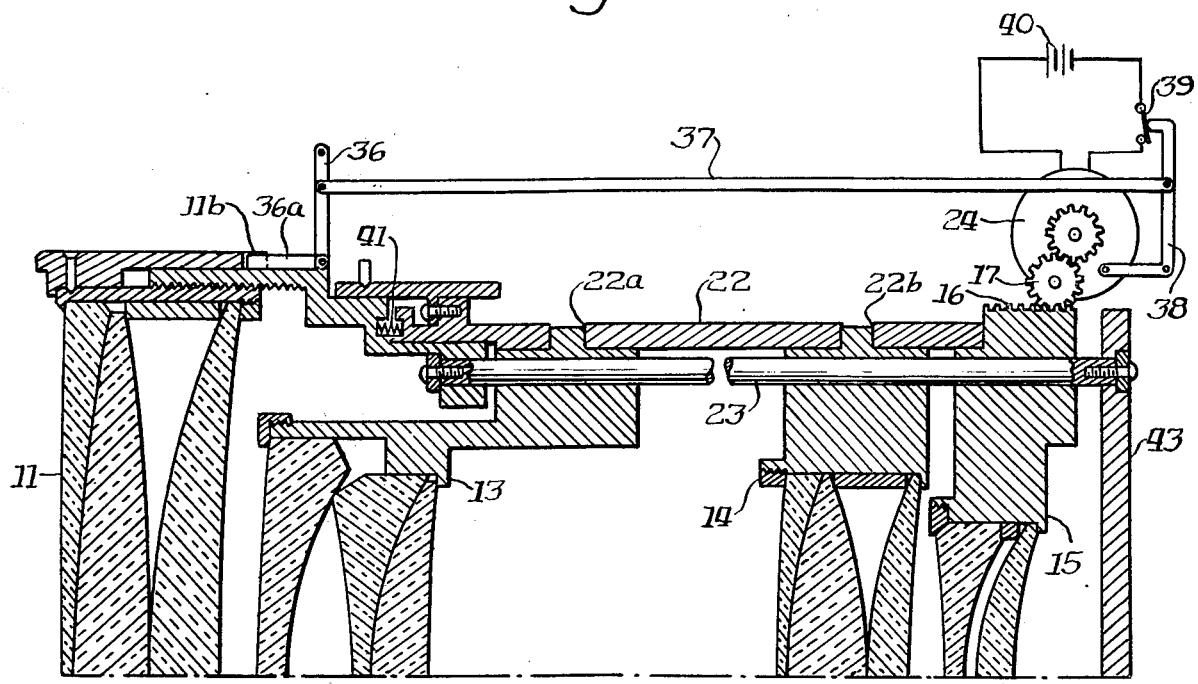
FIG. 2 is a partial cross sectional view of the lens system and the automatic focusing motor for the second, third and fourth lens groups and lock-out linkage for the front focusing objective; the motor drivingly connected to the mounting for the fourth lens group.
Figure 3:
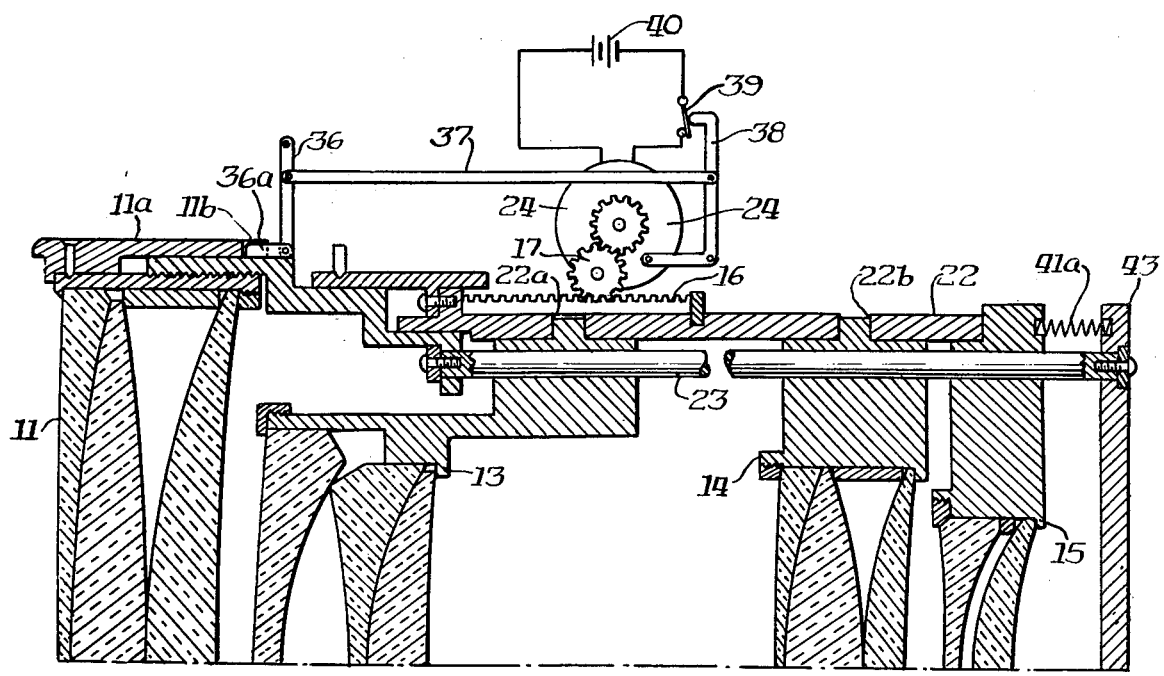
FIG. 3 is a partial cross sectional view of the lens system and the lock-out linkage for the front focusing objective and automatic focusing motor for the second, third and fourth lens groups; the motor drivingly connected to the cam barrel for zooming.

In FIGS. 1, 2, 3, 5 and 7 lenses 13, 14 and 15 move as a unit and can be mounted to a rack 16 driven by a pinion 17 for movement along the optical axis of the lens system. FIG. 5 shows the same lens system as FIG. 1 but it includes a viewfinder peek-in mirror 18 disposed between lens 15 and lens 12 i.e. the fourth lens group and the prime lens. Mirror 18 is a beam splitter which gathers a portion of the bundle of light rays passing through the lens system. The rays gathered are transmitted through a lens 19 and are reflected by mirror 20 into the optics for the viewfinder. The viewfinder optics are generally designated 21. The optical axis OA of the lens system 11, 12, 13, 14 and 15 and the viewfinder axis VA for the optics 21 are parallel to one another. FIG. 2 and 3 are cross sectional views shown in greater detail of a lens systems which are equivalent to the three lens system of FIGS. 1 and 5. That is to say that there are three lens groups 13, 14 and 15 that move in unison. In addition, the structure which moves lenses 13, 14 and 15 as a group is also shown in greater detail, and is likewise designated 16 for the rack and 17 for the pinion. Rack 16 cooperates for sliding axial movement with the individual supporting structures for lens groups 13, 14 and 15 by means of a camming barrel 22 such that the lenses may be moved as a group or the camming barrel 22 may be twisted to move the lenses relative to each other for purposes of zooming. The camming barrel 22 includes cam slots 22a and 22b such that the lens groups may be moved axially either by rotating the camming barrel 22 for zooming or by axially displacing the camming barrel 22. Rack 16 driven by pinion 17 moves camming barrel 22 for axial displacement. In order to prevent rotation of the lens groups 13, 14, and 15 and allow only axial movement there is an axially aligned rod 23 upon which the lens groups may slide.

Figure 7:
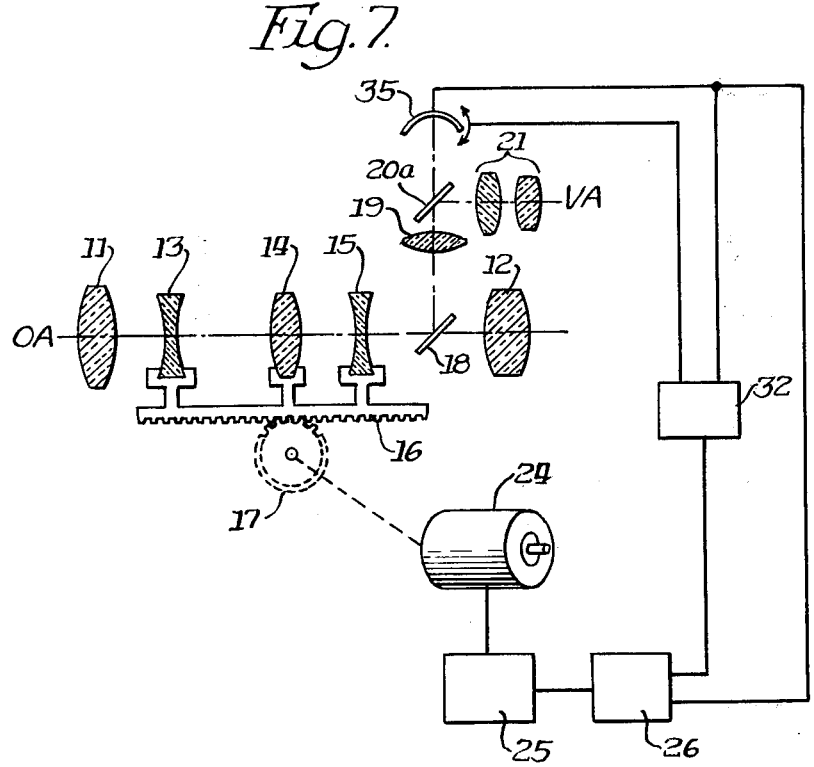
FIG. 7 is a schematic representation of an automatic focusing system with an optical detector aligned along the optical axis of the through the taking lens system and which focusing system controls the second, third and fourth lens groups.

FIG. 7 shows another system wherein lens groups 13, 14 and 15 are moved as a unit. The difference between FIGS. 1 and 7 resides in the methods by which the control motor 24 for driving pinion 17 and automatically focusing lens groups 13, 14 and 15 is activiated. FIG. 1 schematically shows an external rangefinding automatic focusing device and FIG. 7 schematically shows a through the taking lens or internal automatic focusing device. To the extent that the systems are similar the component parts are numbered identically. Therefore, both systems have a motor control circuit 25 which is responsive to a calculating circuit 26. The motor control can be a switching relay for supplying power to the motor to turn it for focus adjustment of the lens according to the signal input from the calculating circuit 26. The input for the calculating circuit 26 depends upon the type of automatic focusing detection used.

In FIG. 1 detection is accomplished by establishing two optical paths designated OP1 and OP2. OP1 is the scanning optical path. That is to say that, there is a scanning mirror 27 mounted for pivotal oscillatory movement by an eccentric cam 28 driven by a cam motor 29. Optical path 1 varies and intersects optical path 2 over a short range located somewhere between near focus and infinity thus transmitting a varying image. Optical path 2 is fixed and is aligned substantially parallel to the optical axis of the camera taking lens such that when the images of optical paths 1 and 2 coincide with one another the distance of the subject can be determined and used as a parameter for adjusting the focus setting of the taking lens by moving lens groups 13, 14 and 15. Detection of image coincidence is accomplished by comparing images transmitted via the optical paths 1 and 2 with a pair of identical photo detectors located within a module 30 such as the Honeywell Visitronics module. Mirrors 31 and 31a are used to reflect the optical paths 1 and 2 for alignment with module 30. Optical path 2 includes a mirror 27a which is fixed to align its axis with mirror 31a for reflection into module 30. Similarly, scanning mirror 27 aligns its image from optical path 1 with mirror 31 for reflection into module 30. When the image from optical path 1 is in coincidence with the image from optical path 2 a peak correlation signal is produced by module 30 and is transmitted to the calculating circuit 26.

To sense the correlation signal on a periodic basis and for purposes of knowing the relative position of the scanning mirror 27 to the location of the focusing lens groups 13, 14 and 15, there is a phase detector circuit 32. Scanning mirror 27 is pivotally mounted to shaft 33. Shaft 33 is connected to gear 34 which is engaged with pinion 17 such that rotation of pinion 17 causes gear 34 to rotate which also rotates shaft 33. Scanning mirror 27 is mounted on shaft 33 for limited pivotal movement. Therefore, rotation of gear 34 and shaft 33 changes the range through which scanning mirror 27 may rotate shifting toward near or far focus as a function of the position of the taking lens focus adjustment. The position, aim or relative range for scanning mirror 27 is indirectly sensed by means of the phase detector circuit 32; in the following manner cam 28 has a nib 28a which activates a phase detector switch arm 32a once per revolution of cam 28. The switching provided by nib 28a is a function of the rotation of cam 28. More particularly as focus of the taking lens is adjusted to be nearly that of perfect focus the aim of scanning mirror 27 points toward the subject and is changed to a lesser degree. The phase detector 32 acts to establish a threshold for monitoring the peak correlation signal once per revolution of cam 28, and for establishing a datum or reference pulse which is time related to the aim of the scanning mirror 27. The aim of mirror 27 being directly related to the timing of the peak signal from module 30. The peak signal is constantly reviewed and the amount that the taking lens is out of focus is determined at least once per cycle so that corrections in the focus of the lens and the alignment of scanning mirror 27 are automatically made.

The scanning system for automatic focusing in FIG. 7 includes the focusing system shown in FIGS. 1 and 5 with different automatic focusing detecting components. The difference being that the detection system of FIG. 7 is accomplished by use of a photo detector 35 positioned in the viewfinder. The mirror 20 in FIG. 5 has been replaced by a prism beam splitter 20a in FIG. 7 such that a portion of the light traveling through the viewfinder will be permitted to reach the detector 35.

Detector 35 is mounted for dithered movement along the optical axis of the light passing through beam splitter 20a. When the image transmitted along the optical axis of the taking lens is in perfect focus the light reaching detector 35 will be at a maximum. Conversely when the taking lens is not in perfect focus the light reaching detector 35 will be less than maximum. In this particular detector circuit the movement of detector 35 will generate a fluctuating signal that will peak when the detector 35 is moved into a position where the rays focus. That position is sensed by a phase detector 32 in a fashion similar to that explained in connection with FIG. 1 and the position to which detector 35 is dithered for a peak signal is periodically applied as an input signal for the calculating circuit 26 which in turn transmits a control input to the control circuit 25 for activating focusing motor 24 to turn pinion 17 moving focusing rack 16 thereby shifting the point at which detector 35 senses a peak signal. It will be appreciated that FIG. 7 discloses a technique whereby feedback allows the taking lens to be promptly brought into focus.

FIG. 4 is a schematic presentation of a taking lens system which is similar to FIG. 5 both are afocal systems. However, focusing is accomplished by movement of both the variator or second lens group 13 and the compensator or third lens group 14 as a unit. The lens system in FIG. 4 has no collimator per se. Since the design of the compensator 14 is such that collimation is provided. For purposes of automatic focusing and detection the detector system shown in FIG. 1 or in FIG. 7 can be used since the optical system in FIG. 4 is so similar to that shown in FIG. 5.

Figure 9:
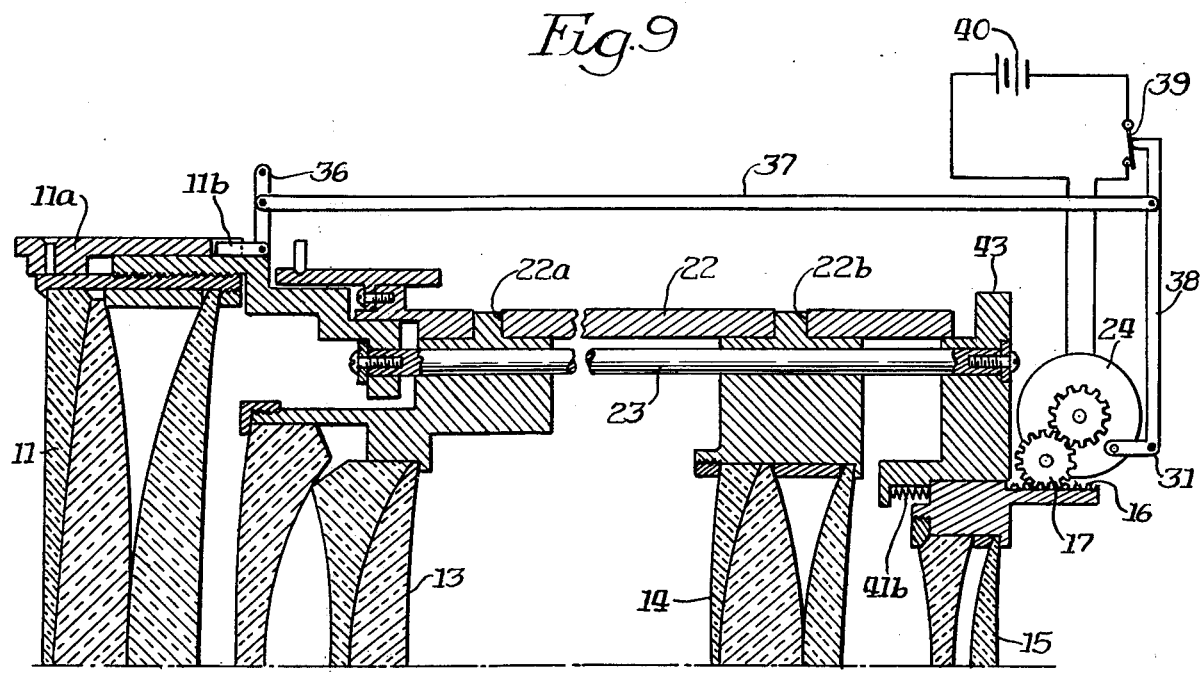
FIG. 9 is a partial cross sectional view of a lens system with a lock-out linkage for the front focusing objective and an automatic focusing control motor for the fourth lens group; the motor being drivingly connected to the mounting of the fourth lens group.

FIGS. 2, 3 and 9 are similar in that all show a detailed cross sectional view of the taking lens system and a schematic representation of the automatic focusing motor 24 and front focusing objective lock-out latch. The latch is best shown in FIG. 6 which is an enlarged partial perspective of the front focusing ring 11a and the camera body 43. Pivotally mounted on the body 43 is a bell crank shaped latching arm 36 which includes a latching pawl 36a to fit within a recess 11b on focusing ring 11a. FIGS. 2, 3 and 9 show the latching pawl 36a engaged with the recess 11b thereby preventing the rotary movement of ring 11a (i.e. for manually focusing the front focusing objective 11 independent of the camera body 43). The crank 36 is connected by a transverse arm 37 to a pivotal motor mount control link 38 such that crank 36 and link 38 move arcuately together but in spaced parallel relation whereby the latch 36a is engaged with recess 11b at the same time the motor 24 is engaged with the pinion 17 to drive rack 16. A normally open switch 39 composed of a pair of contacts is closed when link 38 bears upon one of the contacts and power from battery 40 is connected to the motor 24. While not shown in any of the FIGS. 2, 3 or 9 the circuit between battery 40 and switch 39 may include either of the automatic focus detecting circuits shown for example in FIGS. 1 or 7. Upon release of the lock-out and disengagement of the motor by clockwise movement of crank 36 the moveable lens elements 13, 14 and 15 in FIG. 2 are driven to a rearwardmost position by a spring 41 disposed between the leading edge of the cam barrel 22 and a portion of the camera body 43. Thus when the photographer chooses to manually focus crank 36 can release the front focusing objective and automatically position the moveable focusing optics (second lens group, third lens group and fourth lens group) in a predetermined position or at finite distance. FIGS. 3 and 9 operate in a similar fashion. However, the spring in FIG. 3 is labeled 41a and is positioned so as to push the cam barrel 22 to the forwardmost point when the crank 36 is shifted to the manual focusing position thus the lens in at infinity. Similarly, in FIG. 9 spring 41b is positioned to pull the fourth lens group 15 forwardly when the front focusing objective 11 and the focusing motor 24 are unlocked and disengaged respectively also setting the lens at infinity from which point it is manually focused. Another difference between FIGS. 2, 3 and 9 resides in the location of the drive motor 24 relative to the lens groups. In FIG. 2 the preferred embodiment because of its compactness the drive motor 24 is connected to a rack 16 atop the mounting for the fourth lens group 15. Group 15 positively drives the second and third lens groups 13 and 14 forwardly by engagement with cam barrel 22 and for return compression spring 41 urges cam barrel 22 against the mounting for fourth lens group 15 as lens group 15 is returned rearward by motor 24. Similarly, in FIG. 3 the compression spring 41a bears against the mounting for the fourth lens group 15 in order to keep it in contact with the cam barrel 22 when the motor 24 is driving the cam barrel 22. In FIG. 9 fourth lens group 15 is shown in its forwardlymost position such that its mounting bears against the camera body 43. Spring 41b is a tension spring which tends to pull the mount for fourth lens group 15 toward the camera body 43. Consequently, for focusing the drive motor 24 drives fourth lens group 15 rearwardly against the pressure of tension spring 41b. During the automatic focusing only fourth lens group 15 in FIG. 9 is moved. Upon release of the front focusing objective 11 and the automatic focusing motor 24 the tension spring 41b pulls fourth lens group 15 to its forwardly most position.

Figure 10:
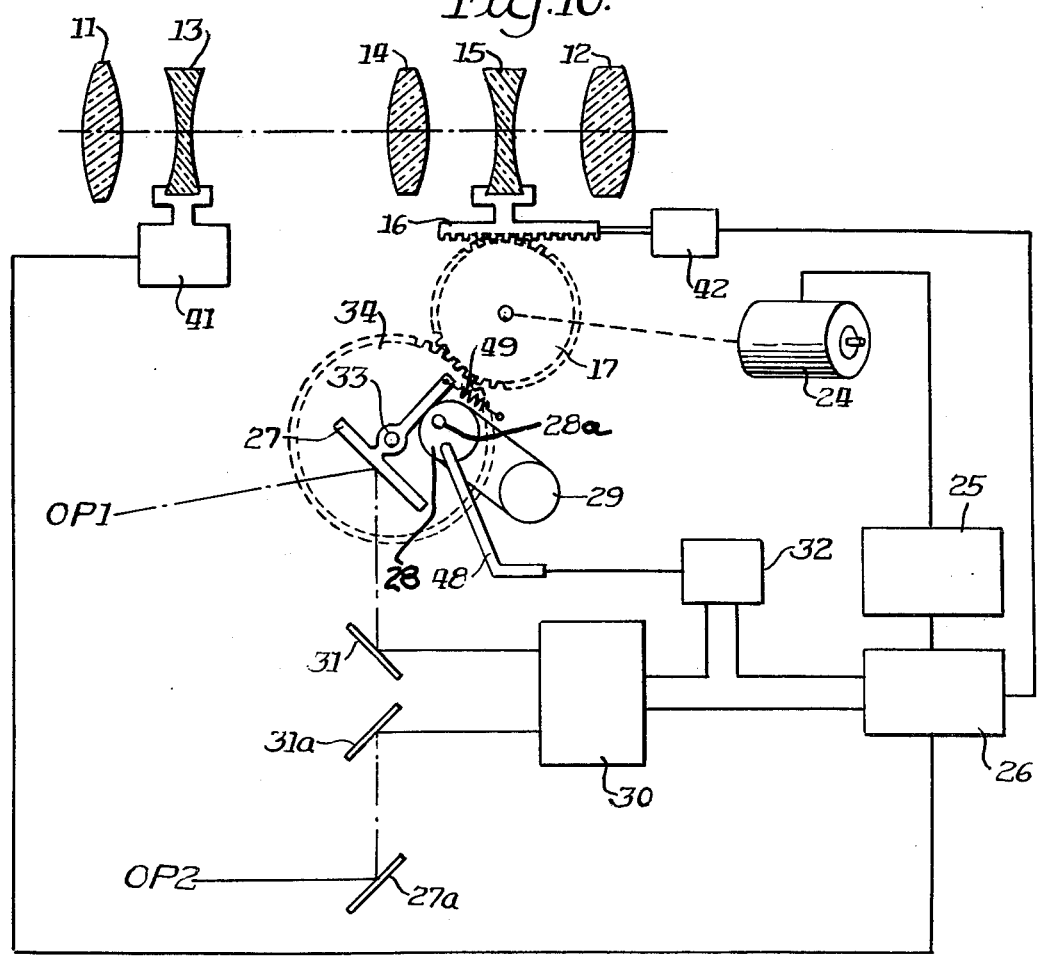
FIG. 10 is a schematic representation of the rangefinder automatic focusing control system for the fourth lens group the movement of which is related to the position of the second lens group.

FIG. 10 shows a slightly different focusing arrangement for the taking lens. In FIG. 10 the fourth lens group 15 is moved for automatic focusing. A structure such as that shown in FIG. 9 can be used. Also shown in FIG. 10 is a detection system similar to that shown in FIG. 1. However, certain changes and refinements have been added to the detection system. That is to say that, the detection system includes two additional inputs for the calculating circuit 26. These additional inputs are necessary because of the way in which focusing is performed which is optically different than the manner in which it was performed in the lens systems of FIGS. 1 through 5 and 7. Those systems are generally afocal meaning that the light coming into the taking lens is substantially collimated whether by the fact that the subject is at infinity or the front focusing objective 11 is adjusted to render the light rays parallel to one another. To be afocal the light rays leaving must also be collimated i.e. systems such as shown in FIG. 1 through 5. Therefore, the light leaving the fourth lens group or collimator 15, in FIGS. 1, 2, 3, and 5 or the compensator 14, FIG. 4 is also parallel or collimated.

Figure 8:
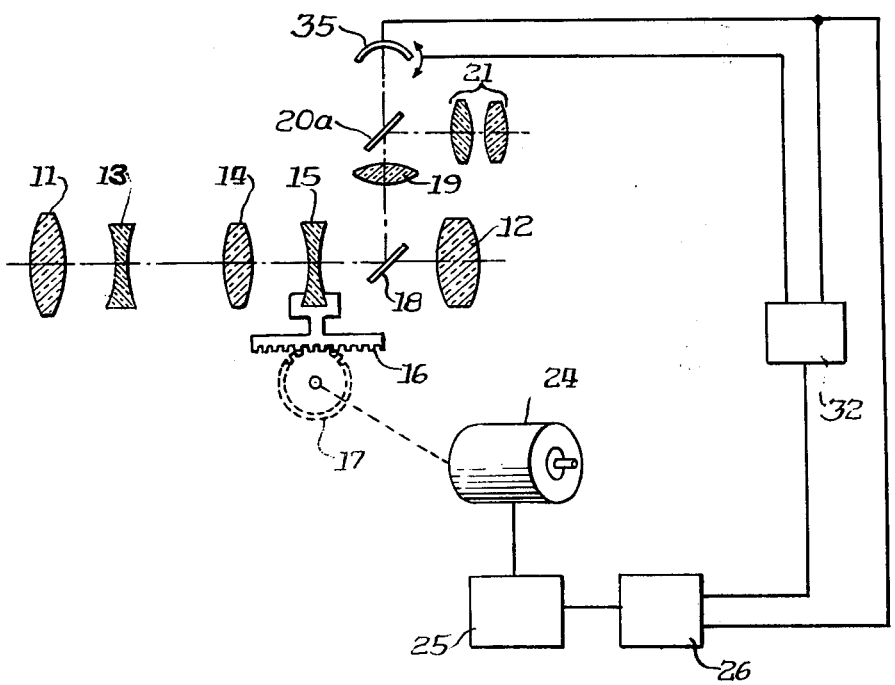
FIG. 8 is a schematic representation of an automatic focusing system with an optical detector aligned along the optical axis of the through the taking lens system and which focusing system controls the fourth lens group.

In FIG. 10 the automatic focusing position for fourth lens group 15 must be a function of the position of second lens group 13. The automatic focusing system will operate correctly if the relative positions of lens groups 13 and 15 are known to the calculating circuit 26 at any instance. For the focusing position of lens group 15 is dependent upon where lens group 13 is. Position indicating devices 41 and 42, in the form of variable resistors in a bridge circuit or the like give the relative positions of groups 13 and 15 to the calculating circuit 26. In operation the second lens group 13 can be moved manually by the operator for zooming (or by power zooming) but the position indicating devices 41 and 42 feed back the correct focus information for group 15. Focusing for the lens system of FIG. 10 can also be performed by movement of only lens group 14, but with such an approach the manual focusing is complicated considerably. While FIG. 10 shows a detection system like that in FIG. 1 a detection system like that in of FIG. 7 can also be applied to the automatic focusing scheme of the taking lens for FIG. 10. If the detection system of FIG. 7 is used the position indicating device 41 is not necessary. FIG. 8 schematically shows just such an application which operates similar to the devices of FIGS. 7 and 10 the operation will not be explained except to say that the reference numerals are identical where the components are the same, and that the alternative of moving group 14 is also possible but complicated.

As those skilled in the art will no doubt appreciate many changes, refinements and modifications can be made to the construction and execution of an automatic focusing system which is highly efficient because it moves the lens elements which are closer to the camera body during automatic focusing and it is therefore contemplated that the claims which follow will cover all of the various combinations, permutations and arrangements that are possible.

I claim:

1. A camera with a zoom lens adapted to be used for automatic and manual focusing which includes a camera body adapted to mount the zoom lens having an optical axis extending from said camera body through a front objective, a first manual focusing system selectively engaged for operation, said first system with a focusing objective moveable along the optical axis and positioned at the distal portion of the optical axis away from said camera body, a second automatic focusing system for mutually exclusive selective engagement when said first system is rendered inoperative, said second system having lens means mounted for movement along the optical axis of the zoom lens for zooming and for focusing said lens means being positioned between said front objective and said camera body, an automatic focusing detection means including a photo sensitive cell being cyclically subjected to light from a subject to detect a peak signal for determining the range of the subject and being associated with said lens means for positioning said lens means for optimum focus.

2. The zoom lens of claim 1 wherein said lens means is mounted on a cam member supported on said body for rotary and translatory motion for operation in first and second modes said first mode being zooming controlled by movement of said member in a direction normal to the optical axis said second mode being automatic focusing controlled by movement of said member along the optical axis of the zoom lens.

3. The zoom lens of claim 1 wherein said lens means mounting includes a rack drivingly connected to the pinion and said automatic focusing system includes an electronically controlled motor adapted to drive said pinion for movement of said rack along a path parallel to said optical axis.

4. The zoom lens of claim 3 wherein said lens means includes optics and said mounting further includes a camming barrel supported on said body for rotary and translatory motion said rotary motion driving said optics of the zoom lens for interdependent cammed movement to vary the magnification of images passing through said optics while translatory motion produces a change in the focus of images passing through said optics.

5. The zoom lens of claim 1 wherein said automatic focusing system includes a motor driven mechanism for adjusting the position of said lens means along the optical axis, said mechanism being mounted for movement from a first position of driving engagement of said mounting for said lens means to a second position of disengagement from said mounting for said lens means.

6. The zoom lens of claim 5 wherein said mechanism is mechanically coupled to said first manual focusing system by linkage such that disengagement of said manual focusing system causes disengagement of said mechanism and said lens means is biased for movement to a standard position for manual focusing of said front objective.

7. The zoom lens of claim 1 wherein said lens means includes the second, third and fourth lens groups in a variator, compensator and collimator type zoom lens such that said groups move axially along the optical axis as a group in a spaced predetermined relationship for focusing and are moved axially along the optical axis in a controlled interdependent relationship relative to one another for zooming.

8. The zoom lens of claim 1 wherein said lens means includes a first lens group fixed during zooming, the second lens group as a variator, the third lens group as a compensator, and the fourth lens group fixed during zooming said second, third, and fourth lens groups mounted for movement axially along the optical axis as a group in spaced, predetermined relationship for focusing and said second and third lens groups moveable axially along the optical axis in controlled interdependent relationship relative to one another for zooming.

9. The zoom lens of claim 1 wherein the first lens group is fixed during zooming, the second lens group as a variator, the third lens group as a compensator, and the fourth lens group fixed during zooming said second and third lens groups are mounted for movement axially along the optical axis as a group in a spaced, predetermined relationship for focusing and are moved axially along the optical axis in a controlled interdependent relationship relative to one another for zooming.

10. The zoom lens of claim 1 wherein said lens means includes the fourth lens group such that said group moves axially along the optical axis for focusing.

11. The zoom lens of claim 10 wherein said fourth lens group focusing movements are interdependent upon the position of the second lens group.

12. A camera with a zoom lens adapted to be used for automatic focusing and manual focusing which includes a camera body adapted to mount the zoom lens having an optical axis extending from said camera body through a front objective, an automatic focusing system having lens means mounted for movement along the optical axis of the zoom lens for zooming and for focusing, said lens means being positioned between said front objective and said camera body, an automatic focusing detection means including a photosensitive cell being cyclically subjected to light from a subject to detect a peak signal for determining the range of the subject and being associated with said lens means for positioning said lens means for optimum focus, and a motor driven mechanism for adjusting the position of said lens means along the optical axis, said mechanism being mounted for movement from a first position of driving engagement with the mounting for said lens means to a second position of disengagement from said mounting for said lens means to permit manual focusing.

13. The zoom lens of claim 1 wherein said lens means is mounted on a cam member supported on said body for rotary and translatory motion for operation in first and second modes said first mode being zooming controlled by rotary movement of said member in a direction normal to the optical axis said second mode being automatic focusing controlled by movement of said member along the optical axis of the zoom lens.

14. The zoom lens of claim 1 wherein said lens means mounting includes a rack drivingly connected to a pinion and said automatic focusing system includes an electronically controlled motor adapted to drive said pinion for movement of said rack along a path parallel to said optical axis.

15. The zoom lens of claim 14 wherein said lens means includes optics and said mounting further includes a camming barrel supported on said body for rotary and translatory motion said rotary motion driving said optics of the zoom lens for interdependent cammed movement to vary the magnification of images passing through said optics while translatory motion produces a change in the focus of images passing through said optics.

16. The zoom lens of claim 12 wherein said mechanism is mechanically coupled such that disengagement of said mechanism permits biased movement of said lens means to a standard position for manual focusing.

17. The zoom lens of claim 16 wherein said lens means includes the second, third and fourth lens groups in a variator, compensator and collimator type zoom lens such that said groups move axially along the optical axis as a group in a spaced predetermined relationship for focusing and are moved axially along the optical axis in a controlled interdependent relationship relative to one another for zooming.

18. The zoom lens of claim 16 wherein said lens means includes the first lens group fixed during zooming, the second lens group as a variator, the third lens group as a compensator, and the fourth lens group fixed during zooming said second, third, and fourth lens groups mounted for movement axially along the optical axis as a group in spaced, predetermined relationship for focusing and said second and third lens groups moveable axially along the optical axis in controlled interdependent relationship relative to one another for zooming.

19. The zoom lens of claim 16 wherein the first lens group is fixed during zooming, the second lens group as a variator, the third lens group as a compensator, and the fourth lens group fixed during zooming said second and third lens groups are mounted for movement axially along the optical axis as a group in a spaced, predetermined relationship for focusing and are moved axially along the optical axis in a controlled interdependent relationship relative to one another for zooming.

20. The zoom lens of claim 16 wherein said lens means includes the fourth lens group such that said group moves axially along the optical axis for focusing.

21. The zoom lens of claim 20 wherein said fourth lens group focusing movements are interdependent upon the position of the second lens group.

* * * * *

UNITED STATES PATENT AND TRADEMARK OFFICE
CERTIFICATE OF CORRECTION

PATENT NO. : 4,183,639
DATED : January 15, 1980
INVENTOR(S) : Michiharu Suwa

It is certified that error appears in the above-identified patent and that said Letters Patent are hereby corrected as shown below:

Column 1, line 65, "Anyone" should read -- Any one --.

Column 1, line 67, "That is to any that as the" should read -- That is to say that, as the --.

Column 1, line 68, "focused the" should read -- focused, the --.

Column 2, line 2, "performed" should read -- perform --.

Column 2, line 68, "there between" should read -- therebetween --.

Column 3, line 29, "of a lens systems" should read -- lens systems --.

Column 4, line 31, "to" should read -- on --.

Column 5, line 27, "per se. Since" should read -- per se, since --.

Column 5, lines 63 and 64, "Thus when the photographer chooses to manually focus crank 36 can" should read -- Thus, when the photographer chooses to manually focus crank 36, he can --.

Column 6, line 5, "the lens in at infinity." should read -- positioning the lens at infinity. --.

Column 6, line 54, "FIG." should read -- FIGS. --.

Column 7, line 8, "FIG. 1 a detection system like that in of FIG. 7" should read -- FIG. 1. A detection system like that of FIG. 7 --.

UNITED STATES PATENT AND TRADEMARK OFFICE
CERTIFICATE OF CORRECTION

PATENT NO. : 4,183,639

DATED : January 15, 1980

INVENTOR(S) : Michiharu Suwa

It is certified that error appears in the above-identified patent and that said Letters Patent are hereby corrected as shown below:

Claim 1, Column 7, line 41, "focusing said" should read -- focusing and said --.

Claim 2, Column 7, line 51, "modes said" should read -- modes, said --.

Claim 2, Column 7, line 53, "axis said second" should read -- axis, said second --.

Claim 8, Column 8, line 29, "zooming said second" should read -- zooming, said second --.

Claim 9, Column 8, line 39, "zooming said second" should read -- zooming, said second --.

Claim 13, Column 9, line 6, "second modes said first" should read -- second modes, said first --.

Claim 13, Column 9, line 8, "optical axis said second" should read -- optical axis, said second --.

UNITED STATES PATENT AND TRADEMARK OFFICE
CERTIFICATE OF CORRECTION

PATENT NO. : 4,183,639

DATED : January 15, 1980

INVENTOR(S) : Michiharu Suwa

It is certified that error appears in the above-identified patent and that said Letters Patent are hereby corrected as shown below:

Claim 18, Column 10, line 10, "zooming said second" should read -- zooming, said second --.

Signed and Sealed this

Twenty-first Day of July 1981

[SEAL]

Attest:

GERALD J. MOSSINGHOFF

Attesting Officer    Commissioner of Patents and Trademarks